(12) United States Patent  
Florkey et al.

(10) Patent No.: US 8,125,990 B2  
(45) Date of Patent: Feb. 28, 2012

(54) SILENT PROBE FOR NETWORK DELAY REPORTING

(75) Inventors: Cynthia Kae Florkey, Chicago, IL (US); Ruth Schaefer Gayde, Naperville, IL (US); John Richard Rosenberg, Elmhurst, IL (US)

(73) Assignee: Alcatel Lucent, Paris (FR)

( * ) Notice: Subject to any disclaimer, the term of this patent is extended or adjusted under 35 U.S.C. 154(b) by 1755 days.

(21) Appl. No.: 11/372,591

(22) Filed: Mar. 10, 2006

(65) Prior Publication Data

US 2007/0213007 A1 Sep. 13, 2007

(51) Int. Cl.
*H04L 12/56* (2006.01)

(52) U.S. Cl. ............ 370/392; 370/351; 370/395.3; 370/395.31; 370/519; 455/428; 455/242.1; 455/242.2; 455/67.16

(58) Field of Classification Search ............ None
See application file for complete search history.

(56) References Cited

U.S. PATENT DOCUMENTS

| 5,923,745 | A  | * | 7/1999  | Hurd ................... 379/265.02 |
| 6,421,442 | B2 | * | 7/2002  | Slutsman et al. ........ 379/221.13 |
| 6,717,916 | B1 | * | 4/2004  | Ahn et al. ................. 370/252 |
| 6,956,865 | B1 | * | 10/2005 | Khaunte et al. ............. 370/442 |
| 2004/0146056 | A1 | * | 7/2004 | Martin ..................... 370/401 |
| 2005/0172141 | A1 |   | 8/2005  | Gayde et al. |
| 2005/0271196 | A1 |   | 12/2005 | Florkey et al. |
| 2006/0029076 | A1 | * | 2/2006 | Namihira et al. ............ 370/392 |
| 2007/0036316 | A1 | * | 2/2007 | Croak et al. ............ 379/201.11 |
| 2008/0192920 | A1 | * | 8/2008 | Bhusri ..................... 379/229 |

* cited by examiner

*Primary Examiner* — Huy Vu  
*Assistant Examiner* — Zewdu A Beyen  
(74) *Attorney, Agent, or Firm* — Fay Sharpe LLP (57) ABSTRACT

Systems are presented in which a network database is populated and updated with delay values representing measured network delays in routing calls between call control entities of a communications network. The network entities can query the database to make informed decisions regarding call routing based on the delay values, and the database entries are provided by the network elements, which measure actual or pseudo calls routed in the network.

23 Claims, 4 Drawing Sheets

FIG. 1

| NETWORK DELAY DATABASE | | | | | | |
|---|---|---|---|---|---|---|
| | NEAR NETWORK ELEMENT | FAR NETWORK ELEMENT | CARRIER OF INTEREST | DESTINATION DN FOR EXPLICIT QUERY | DATE & TIME OF LAST REPORT | DELAY (ms) | CARRIER USED |
| 22a → | CCE1 | JIP FOR CCE2 | ABC | DN FOR CCE2 | TS1 | xxx | ABC |
| 22b → | CCE1 | JIP FOR CCE2 | XYZ | DN FOR CCE2 | TS2 | xxx | XYZ |
| 22c → | CCE1 | JIP FOR CCE3 | ANY | DN FOR CCE3 via DEFAULT CARRIER | TS3 TS4 TS5 | xxx xxx xxx | ABC XYZ DEF |
| 22d → | CCE2 | JIP FOR CCE3 | ABC | DN FOR CCE3 | TS6 | xxx | ABC |
| 22e → | CCE3 | JIP FOR CCE4 | ABC | DN FOR CCE4 | TS7 | xxx | ABC |
| | ... | ... | ... | ... | ... | ... | ... |

SILENT PROBE FOR NETWORK DELAY REPORTING

FIELD OF THE INVENTION

This invention relates generally to the field of telecommunication systems and, more particularly, to systems and methods for determining delay characteristics of telecommunications systems and for providing a network database with system delay information, and will be described with specific reference thereto, although the invention may find utility in other fields and applications.

BACKGROUND OF THE INVENTION

Communication systems are well known in which persons initiate or receive telephone calls using, for example, wireless or wireline phones, where the calls are routed through a series of routing connections in traditional wired telephone networks and/or wireless networks between the calling and called parties, wherein the call may be routed through different carriers depending on congestion in a given system. In certain instances, it may be important that particular delay-sensitive calls be connected as quickly as possible, for example, such as 911 emergency calls, Wireless Priority Service calls, emergency preparedness/Government Emergency Telephone Service (GETS) calls, defense network calls (Multi-Level Precedence and Preemption), etc. Certain conventional network routing technology may allow an after-the-fact determination of the ability to route a call or session between individual network elements on a hop-by-hop basis. For instance, in packet-switched IP networks, RTCP (Real Time Control Protocol) may provide information on certain packets in a call, such as interval jitter, number of packets sent or lost, and packet path delay. Dynamic non-hierarchical routing (DNHR) uses statistical predictability of aggregated telephone traffic and the fact that switches and links are usually available to select two-hop paths when a given shortest one-hop path is blocked. However, the current routing technologies do not provide the ability to allow call control elements to look at the network from an end to end perspective. Thus, there remains a need for improved systems and methods by which emergency and other high priority calls can be routed in real time using the telephone network routing paths with the shortest measured delay as seen by the network routing elements themselves.

SUMMARY OF THE INVENTION

The following is a summary of one or more aspects of the invention to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The various aspects of the present invention relate to probing a communications network to provide a network database of the delay characteristics of the various paths between specific endpoints. The delay database is available for queries by network elements such as call control elements to facilitate selection of the quickest route for a call, and may find particular utility in routing emergency or other priority calls.

In accordance with one or more aspects of the invention, a system is provided for routing calls through a network, which includes call control elements that are accessible by user equipment to service calling or called parties, as well as a delay database operatively coupled with the network to allow queries by network elements including the call control elements. The delay database is comprised of a number of individual entries with identifiers for a pair of network elements (e.g., near and far end call control elements) and a delay value indicating a measured delay associated with establishing a call through the network from the near to the far end element. In some embodiments, the individual database entries can also include an identifier for a carrier used to route a call through the network and/or a timestamp identifier indicating the age of the measured delay value. Once populated with these measured delays, the database may be queried by a first (e.g., near end) call control element to obtain a delay value associated with a particular call from a calling party user equipment associated with the first call control element to a called party user equipment associated with a second call control element, for use by the first call control element to process the call. In this manner, the decisions on carrier selection and routing paths can be based, at least in part, on measured network delays.

The call control elements, moreover, are involved in populating and updating the database entries, by measuring delays associated with calls routed through the network and reporting the measured delays to the delay database. In one example, the delay database initiates a subscription with a first call control element, for instance, using a probe subscribe message instructing the call control element to provide delay values associated with calls routed from the first call control element to a specified second call control element. The first call control element then measures delays associated with actual calls placed from calling party user equipment associated with the first call control element to called party user equipment associated with the second call control element, and reports the measured delays to the delay database, where the reporting can be periodic in certain implementations. In another operating mode, the call control element is explicitly requested by the database to provide a delay value for calls to a specified second call control element and the first call control element initiates a pseudo call to the second call control element and measures and reports the resulting pseudo call delay. In this fashion, the database can request updates from non-subscribing network elements or from subscribing elements where the current delay entry is stale or suspect.

Further aspects of the invention relate to a method of operating a communications network for routing calls between calling and called parties associated with call control elements operatively associated with the network. The method includes providing a delay database accessible by elements of the network, measuring delays associated with calls routed through the network between given pairs of call control elements, and populating and updating the delay database with the measured delay values, where the measurements may be made, for instance, periodically through a subscription technique, or by explicit queries, etc. The method may further comprise querying the delay database to obtain at least one delay value associated with a particular call from a calling party associated with a first call control element to a called party associated with a second call control element; and using the obtained delay value to process the call.

Still other aspects of the present invention provide a method for routing a call through a network from a calling party user equipment associated with a first call control element to a called party user equipment associated with a second call control element. In accordance with this method, a network element queries a delay database associated with the network to obtain at least one delay value associated with routing calls from the first call control element through the network to the second call control element, and the first call control element routes the call from the calling party to the called party based at least in part on the delay value obtained from the delay database.

Other aspects of the invention relate to a communications network comprised of a plurality of network elements operatively coupled with one another to form a communications network, and a delay database operatively coupled to allow queries by the network elements, where the database includes a plurality of delay values individually associated with routing calls through the network between a given pair of network elements. The network elements include call control elements which measure delays associated with calls routed through the network and report the measured delays to the delay database to populate and update the database entries. The database can initiate subscriptions with the call control elements to provide delay values associated with actual calls routed in the network and/or can send explicit requests to certain call control elements to provide a delay value measured for a pseudo call to another call control element.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings, in which.

DETAILED DESCRIPTION OF THE INVENTION

Figures 1, 2:
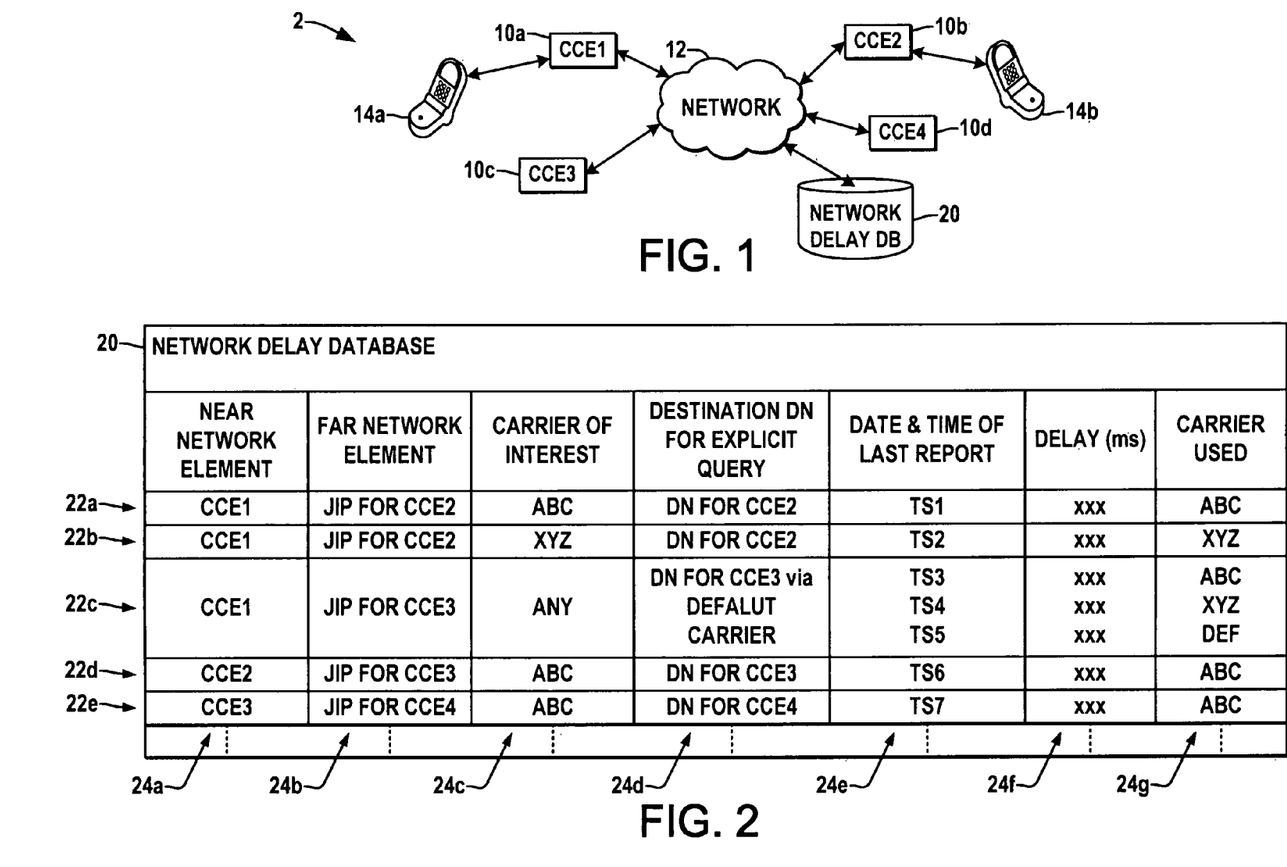
FIG. 1 is a block diagram of a telecommunication system with several call control entities and a network delay database in which embodiments of the present invention may be implemented.
FIG. 2 is a simplified diagram showing further details of the exemplary network delay database in the system of FIG. 1.

Referring now to the figures, several embodiments or implementations of the various aspects of the present invention are hereinafter illustrated and described in conjunction with the drawings, wherein like reference numerals are used to refer to like elements. FIG. 1 shows an exemplary telecommunication system 2 in which one or more aspects of the invention may be implemented, with calls being placed between calling and called parties using various user equipment (UE) 14 operatively coupled with call control elements (CCEs) 10 and a network 12 formed by operative interconnection of various network elements including the CCEs 10 and others (not shown) as are known, wherein four exemplary CCEs 10a-10d are illustrated in FIG. 1. The communications network 12 can be any type or types, including but not limited to Public Switched Telephone Networks (PSTNs), mobile networks, IP-networks, and combinations thereof, wherein the various network elements are operatively associated with one another to allow communications therebetween and therethrough with respect to data and control signaling or messaging.

The call control elements 10 and other elements of the network 12 can be any suitable hardware, software, combinations thereof, etc., which are operatively coupled with the network 12 to provide call control functionality as is known, including but not limited to routing functions and the silent probe functions detailed hereinafter. The CCEs 10 may be implemented, for example, in the form of a central office switch or access tandem such as a switching system and adjunct processors commonly residing in the Public Switched Telephone Network (PSTN), or in other forms such as IMS or other IP-network-based Call Session Control Functions (CSCFs), mobile switching centers (MSCs), etc. Moreover, the CCEs 10 and the functionality thereof may be implemented in integrated entities or may be distributed across two or more entities. The CCEs 10 preferably include memory and processing elements (not shown) for storing and executing software routines for processing and switching calls as well as for providing various call features to calling or called parties, and further provide for the delay measurement and reporting functionality described herein, where the CCEs 10 are generally operative with any suitable circuit, cell, or packet switching and routing technologies, including but not limited to Internet Protocol (IP) and Asynchronous Transfer Mode (ATM) technologies, etc. The exemplary MSC CCEs 10, moreover, are operatively interconnected by bearer and control traffic links (not shown) to accommodate exchange or transfer of bearer traffic (e.g., voice, video, or image data, etc.) and control traffic (e.g., inter-node signaling in accordance with SS7 ISDN User Part (ISUP) or SIP protocols, etc.), respectively, wherein such links may be logical links implemented, for example, as T1 carrier, optical fiber, ATM links, wireless links, and the like, whereas in IMS implementations the call control elements 10 exclusively send and receive control messaging.

The call control elements 10 are interoperable with various forms of user equipment 14, wherein two exemplary wireless phones 14a and 14b are shown in FIG. 1 for ease of illustrating the various aspects of the invention hereinafter. Any form of user equipment 14 may interface with the system 2 via CCEs 10 for placing or receiving calls, for example, wireline or Plain-Old-Telephone-Service (POTS) phones, mobile communication devices such as mobile phones 14a, 14b, personal digital assistants (PDAs), pagers, computers with wireless interfaces, and IP-based devices, such as computers, VoIP phones, etc. The operative coupling of the user equipment 14 with the CCEs 10 may be of any suitable form, for example, conventional subscriber lines, ISDN lines, Ethernet LAN, wherein the form of the interconnection may vary according to the type of user equipment 14. For example, in the case of a wireless phone 14a or 14b, the user equipment communicates via wireless resources with a base station (not shown); and the base station, in turn, is connected via wireline or wireless link to the call control element 108.

For a calling party user equipment 14 initiating a call, the associated CCE 10 may be referred to as an originating or "near end" CCE or network element, and the CCE 10 associated with a called party user equipment 14 receiving a call is referred to as a terminating or "far end" CCE or network element. Depending on the locations of the calling and called party user equipment 14, the originating and terminating CCE network elements may be different or a single CCE 10 may in some cases serve as both the originating and terminating element. However, where calls are to be routed between different originating and terminating CCEs 10, the various aspects of the invention provide for measuring and storing values associated with the delays through the network 12 from end-to-end, wherein the originating CCE is termed the "near end" element and the terminating CCE 10 is termed the "far end" element with respect to such call delivery services and delays.

Referring also to FIG. 2, the system 2 includes a network level delay database 20, with associated network signaling and messaging capabilities and other underlying technology and functionality as described hereinafter to probe the network 12 using the network elements 10 (e.g., through subscriptions, explicit queries, etc.) with respect to collect delay information and statistics, and to store these in the delay database 20. The delay database 20 can be any form of data store and associated functionality, and can be implemented in unitary or distributed fashion in hardware, software, or combinations thereof, which allows receipt of and responses to queries from network elements such as service control points (SCPs), the CCEs 10, and other network entities, to thereby provide delay values or information, such as measured call setup times in one example. The systems and methods described hereinafter may find particular utility when employed in association with telecommunications services and/or applications that need to route calls expeditiously through the network 12, such as the Government Emergency Telephone Service (GETS), 911 calls, Wireless Priority Service calls, etc., to provide such services with knowledge about which of several paths and/or carriers would likely provide the quickest call completion through the network 12. However, the invention is not limited to the enumerated applications and may be advantageously employed in other situations in which the operation of a network entity is facilitated by delay information with respect to end-to-end routing delays in a network.

FIG. 2 illustrates in greater detail an exemplary implementation of a network delay database 20 in the system 2 of FIG. 1, including a plurality of database entries 22 with individual entries 22 including various fields populated with identifiers, values, or other data or information 24. Several exemplary entries 22*a*-22*e* are shown in FIG. 2 for sake of illustration, although any number of such entries may be provided in the database 20. In the illustrated embodiments, moreover, the individual entries 22 include populated fields 24*a*-24*g*, wherein field 24*a* includes a near network element identifier which specifies one of the CCEs 10 associated with a calling party (e.g., identifying a near end CCE 10), and a far network element identifier 24*b* identifies the far end CCE element 10 associated with a called party. In the case of an ISUP implementation, one or both of the fields 24*a* and 24*b* may be populated with Jurisdiction Information Parameter (JIP) identifiers, although any suitable identifying information may be used by which the identity of a particular network element (e.g., CCE1 10*a*) can be ascertained. The far end element may also be identified, for example by DN in field 24*d* for explicit queries, as described further below. The individual entries 22 may also include a carrier identifier field 24*c* indicating a carrier used to route a call through the network 12, wherein the field 24*c* may be populated with specific carrier identifiers (e.g. carriers ABC and XYZ in the illustrated example), or may indicate "ANY" or some other string or tag indicating that the corresponding entry is not specific to a given carrier.

The database entries 22, moreover, include a delay value in field 24*f* indicating a measured delay in any suitable units (e.g., ms in one embodiment), corresponding to the temporal delay in establishing a call through the network 12 from a calling party UE 14 associated with the near end CCE 10 identified in field 24*a* to a called party UE 14 associated with the far end CCE 10 identified by the field 24*b*. In one example, the value 24*f* represents a call setup time, although any other measurable time value of interest may be used. In the illustrated embodiments, moreover, the entries 22 also include a latency or age identifier 24*e*, such as a date and time or other value(s) indicating the age of the measured delay value 24*f*, as well as a field 24*g* showing the carrier used for the particular measured delay value 24*f*. Other fields 24 can be provided in the entries 22 and/or some of the illustrated fields 24 can be omitted in certain embodiments, wherein the illustrated database 20 and the structure thereof are merely examples and are not strict requirements of the present invention. The exemplary database 20 therefore includes a plurality of delay values 24*f* individually associated with routing calls through the network 12 between a given pair of network elements (e.g., identified in fields 24*a* and 24*b*), and is operatively coupled to allow queries by the CCEs 10 and other elements of the network 12. In operation, a first call control element (e.g., CCE1 10*a* in FIG. 1) can query the database 20 to obtain a delay value 24*f* associated with a particular call from a calling party UE 14*a* operatively associated with CCE1 10*a* to a called party device 14*b* associated with CCE2 10*b* (e.g., or other terminating CCE 10), where CCE1 10*a* can then use the obtained delay value 24*f* to advantageously process the call.

Figure 3:
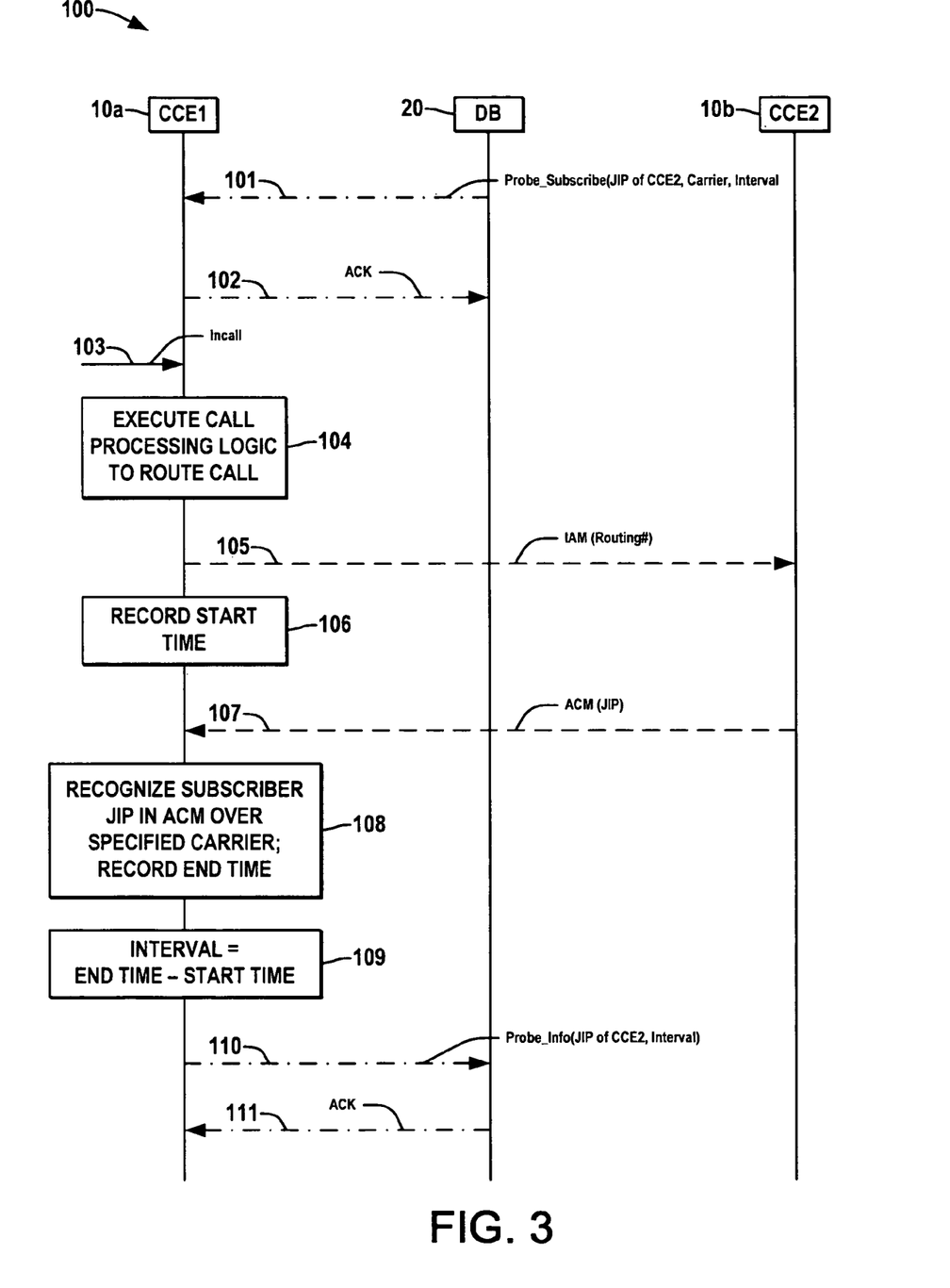
FIG. 3 is an exemplary call flow diagram illustrating subscription mode operation for populating the delay database in the system of FIG. 1.
Figure 4:
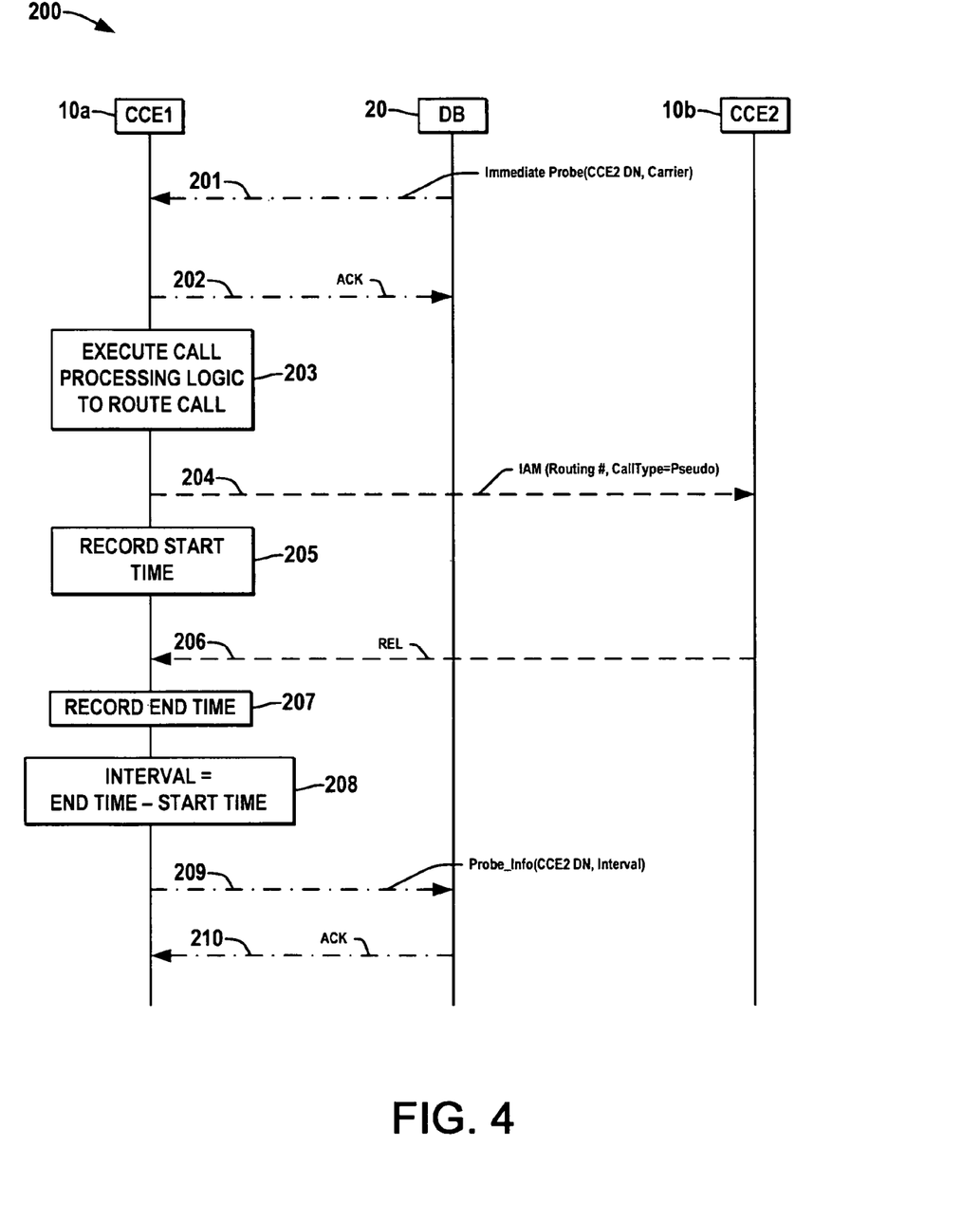
FIG. 4 is an exemplary call flow diagram illustrating an explicit request operating mode for populating the database in the system of FIG. 1.

Referring also to FIGS. 3 and 4, with respect to populating and updating the database entries 22, the call control elements 10 measure the relevant network delays and report these to the database 20 in the illustrated system 2, wherein the age or latency field 24*e* may be used to indicate to a querying element how old or stale the delay value 24*f* is. In one preferred embodiment, the database 20 initiates this delay measurement and reporting activity in one of two modes. FIG. 3 provides an exemplary call flow diagram 100 showing the first such mode, referred to hereinafter as a subscription mode, and the call flow diagram 200 in FIG. 4 shows an explicit request mode for populating and/or updating the network delay database 20.

In the subscription mode example of FIG. 3, the database 20 initiates a subscription through appropriate messaging to a network element, such as CCE1 10*a* in one example, such that the subscribed element CCE1 10*a* thereafter provides delay values 24*f* associated with calls routed from CCE1 10*a* (as the originating or near-end CCE) to a specified second network element (e.g., CCE2 10*b* in the example described below). In this case, CCE1 10*a* measures delays associated with actual calls placed from associated calling party UEs (e.g., mobile 14*a* in FIG. 1 or any other user equipment 14 originating a call to CCE2 10*b* from CCE1 10*a*), and CCE1 10*a* then reports the measured delays 24*f* to the delay database 20. The database 20 then updates the corresponding entry 22 with the new delay value 24*f* as well as an updated latency indicator 24*e*. The subscriber mode measurement and reporting may be done according to any temporal parameters, such as periodically in one embodiment. In this regard, the subscription technique allows silent probing of the network in association with the processing of actual calls, whereby the subscribed CCE 10 may report any activity every two minutes or some other period with respect to the requested far end CCE(s), and may be adapted to continue the subscription until the database requests another reporting period or cancels the subscription, etc. In like manner, the database 20 may establish subscriptions with any number of individual network elements to report call setup times or other delay values of measurable delay values 24*f* for termination elements of interest.

In one implementation, the subscribed element (e.g., CCE1 10*a*) records the response time from the destination of interest, using suitable messages according to the network type and communications protocol. In the case of ISUP implementations, for example, the CCE1 10a starts a timer when sending an Initial Address Message (IAM) and records the timer value upon receiving an Address Complete Message (ACM). In another example, using SIP messaging protocols, the near end element records or otherwise determines the time between sending a SIP INVITE and receiving a 18x response. The actual messaging used in any given implementation may be tailored to provide the information needed by either network element for the delay measurement and reporting functionality described herein. For instance, a parameter identifying the terminating element may be provided in an existing backward call setup message, such as providing the Jurisdiction Information Parameter (JIP) of the far end CCE in the IAM message for ISUP implementations, wherein other suitable messaging may be defined for establishing the subscription (e.g., from the database 20 to the near end network element) and for reporting the delay values (e.g., from the network element 10 to the database 20).

FIG. 3 illustrates an example of a subscription with a first network element CCE1 10a to provide periodic reports of call setup time delays in terminating calls to CCE2 10b. The database 20 initiates the subscription as a persistent task for CCE1 10a by sending CCE1 10a a Probe_Subscribe message 101, listing the JIP of CCE2 10b, as well as a carrier parameter (e.g., specific or "ALL"), and a reporting interval parameter (e.g., every 10th call, every n seconds, every n minutes, etc.), and the Probe_Subscribe message is acknowledged (ACK) by CCE1 10a at 102, whereupon the CCE1 10a marks the subscription in some internal data store. The 'silent probe' subscription message 101 requests CCE1 10a to report call setup delay information to the database 20 with respect to calls to CCE2 10b. Once the subscription is established, therefore, CCE1 10a knows that it must measure delays associate with actual calls to CCE2 10b and update the database 20 with the results. In the illustrated ISUP implementation, the JIP parameter identifies the far end node CCE2 10b. In a SIP implementation, the probe subscription messaging could include the destination IP address of CCE2 10b, which is known by the originating CCE1 10a. When an incoming call occurs at 103 (e.g., a call through CCE1 10a to CCE2 10b), CCE1 10a executes the normal call processing logic at 104 to route the call, which can include digit analysis, HLR query, AIN/WIN queries, and/or NP query, and selection of a carrier to be used based on normal call routing considerations, such as the originator's subscription information, etc. The corresponding IAM message is then sent to CCE2 10b at 105, and CCE1 10a starts a timer at 106 (e.g., or records a "start time"). In a SIP implementation, a SIP INVITE message can alternatively be sent at 105.

The far end (terminating) CCE2 10b receives the IAM 105, and responds with an ACM message at 107, which in this case includes the JIP parameter identifying CCE2 10b as the far end network element. Upon receipt of the IAM, CCE1 10a recognizes the JIP parameter (defined in the ISUP standards) and records the timer value (e.g., or otherwise records an "end time") at 108, and then determines the setup delay timer value (e.g., or computes delay interval=end time−start time) at 109. It is noted that intermediate network elements or nodes may send an ACM (e.g., including a JIP identifying the intermediate node) relating to the initial IAM 105, in which case the subscribed CCE1 10a may ascertain or obtain delay data associated therewith if this is useful for updating another database entry 22, and report this to the database 20. In this case, moreover, the intermediate node will interwork the ACM that eventually comes from the end node 10b (including the JIP of far end element CCE2 10b in this example) into a CPG (Call progress message), and send the CPG message to the near end element CCE1 10a. Since this CPG message includes the JIP identifying CCE2 10b, the CCE1 10a will check its list of subscribed far end elements, and will determine the overall delay value for the call setup to CCE2 10b at 108 and 109. At the specified reporting interval, the subscribed CCE1 10a then reports the latest delay value to the database 20 using a Probe_Info message at 110, and the database 20 acknowledges the data with an ACK message at 111.

Referring also to FIG. 4, it is noted in the above example that where no actual calls are originated by the subscribed CCE1 10a within a given period, the corresponding delay value 24f in the database entry 22 will grow older and older, as indicated by the age identifier field 24e. In this type of situation, the database 20 may request an update from the CCE 10a using an explicit query in a second operating mode. Of course, the explicit delay data request mode can be used in other situations, for instance, where delay information is needed with respect to a far end node that is seldom accessed, or where the subscription reporting interval is lengthy and the current database entry 22 is stale or suspect, or for other reasons. In this explicit mode, the delay database 20 sends an explicit request for information to specific network routing elements, where the call flow 200 in FIG. 4 shows an example of this operating mode, again using CCE1 10a and CCE2 10b as the near and far end elements of interest. In the explicit mode, standard messaging can again be utilized to the extent possible, with suitable modifications thereto to implement the functionality described herein. For instance, a parameter may be added to otherwise conventional ISUP IAM or SIP INVITE messaging to indicate the call type as a "pseudo call", although for these protocols, the normal call clearing messaging may remain unchanged (e.g., ISUP REL or SIP 4xx). Upon receipt of a pseudo call setup message, the individual intermediate nodes pass the message along toward the ultimate destination and provide the conventional setup and tandeming functions, and when the pseudo call setup is received by the far end node, the far end node responds to the originator using a call clearing message or other suitable messaging but refrains from alerting the end user and connecting the bearer data path. Other forms of call setup and response messaging can be employed using new messages or suitable modification of existing message formats and contents in conjunction with adaptation of the responsive behavior by the intermediate and far end nodes by which a call type field, parameter, or other indicia or marking is provided in a call setup message indicating to the servicing far end and intermediate nodes that the setup is for a pseudo call, with these nodes providing the necessary setup and response functions to provide the initiating call control element with a call clearing or other type response from which the requested delay value can be ascertained without connecting the bearer path or otherwise alerting the end user.

In the call flow 200 of FIG. 4, the delay database 20 initiates the explicit request with an Immediate_Probe message at 201, which specifies the DN of the far end CCE2 10b, as well as a particular carrier of interest (or ALL) thereby requesting an explicit report from CCE1 10a on the delay from CCE1 10a to CCE2 10b, and the near end element 10a acknowledges the probe (ACK) at 202. When CCE1 10a receives such a request 201 from the database 20, it will send a "Pseudo Call Setup" message to the far end CCE2 10b, and wait for response, wherein any intermediate nodes will pass this message along toward CCE2 10b according to the normal or standard call setup and tandeming functions. It is noted with respect to number portability, that the exact DN in the Immediate_Probe message 201 is not critical, wherein any DN can be used that is homed at the far end CCE2 10*b*, preferably an LRN (Location Routing Number) for CCE2 10*b* or any DN known to be at CCE2 10*b*.

The far end node CCE2 10*b* recognizes the call setup as a pseudo call, and accordingly will not connect the bearer path, and will undertake other actions such as sending a call clearing message, etc., to respond to the near end CCE1 10*a*, while causing any intermediate network elements to release any previously allocated resources. In the illustrated example, using the information specified in the Immediate_Probe message 201, CCE1 10*a* executes the required call processing logic to route the pseudo call at 203, and sends the pseudo call IAM message to the far end CCE2 10*b* at 204 with a routing number and a call type field parameter indicating that the call type is a pseudo call. At this point, the near end CCE1 10*a* also records the start time (or starts a timer) at 205. When the far end 10*b* receives the pseudo call IAM 204, it sends back a release (REL) message 206, whereupon the near end CCE1 10*a* knows by implication where the REL came from and accordingly records the end time at 207 for computing the delay interval value at 208. At 209, the near-end element CCE1 10*a* sends a Probe_Info message to report the delay value to the database 20, along with the DN for the far-end CCE2 10*b* for updating the corresponding database entry 22, and the database 20 acknowledges the information at 210.

Figure 5:
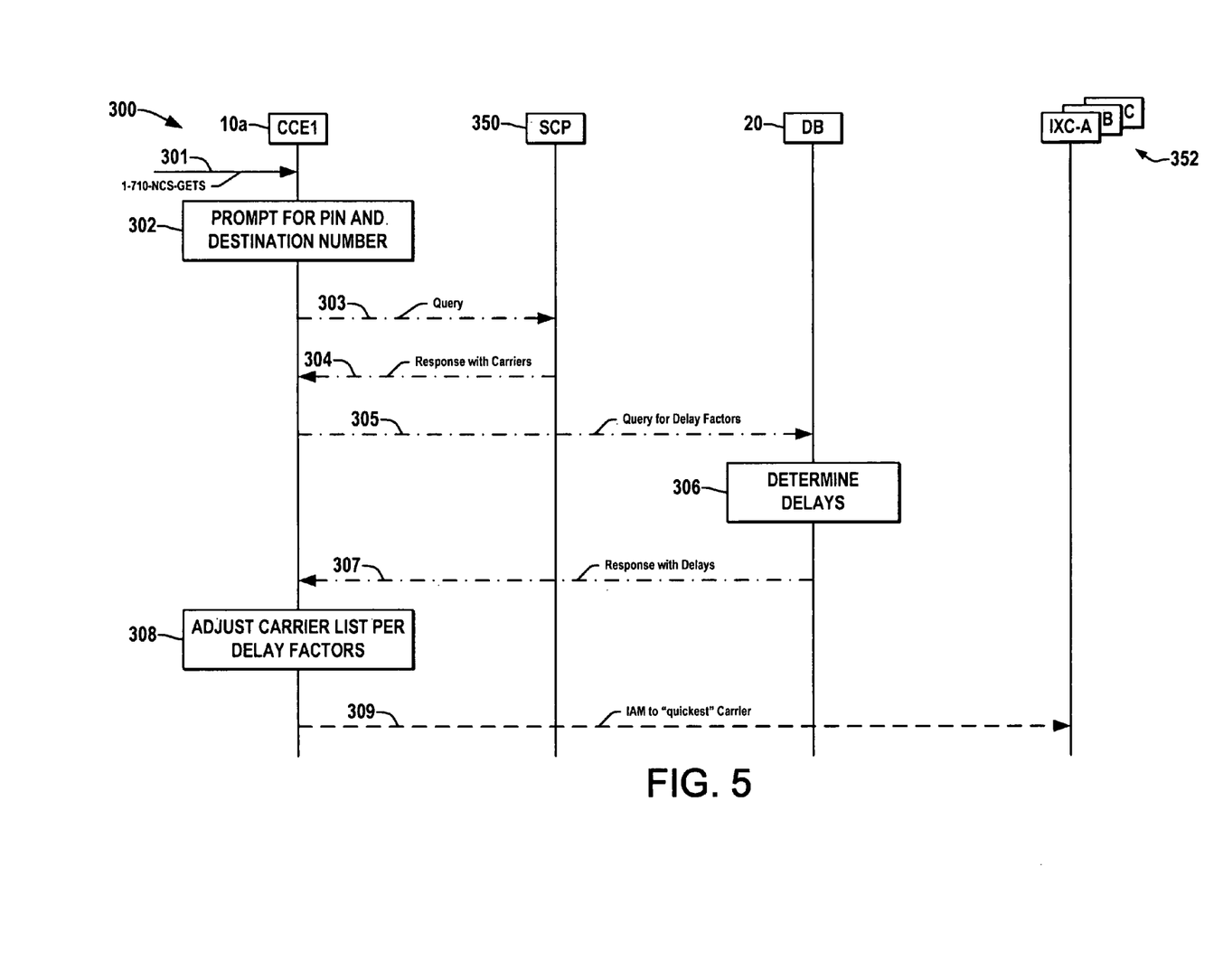
FIG. 5 is an exemplary call flow diagram illustrating routing of a GETS call using the network delay database in the system of FIG. 1.

Referring now to FIG. 5, call flow 300 shows exemplary call routing for a GETS call using the network delay database 20 in the system 2. At 301, an end user places a GETS call by dialing for example 1-710-NCS-GETS, and the user is prompted at 302 by CCE1 10*a* for PIN and destination DN information. Once these have been provided by the user, the CCE1 10*a* initiates a query at 303 to an AIN Service Control Point (SCP) 350, which then returns routing instructions at 304 including a list of three interexchange carrier codes corresponding to carriers IXC-1, IXC-b, and IXC-C 352 in FIG. 5. In this example, the CCE1 10*a* then queries the above-described delay database 20 at 305, specifying the three carriers from the response 304 and the destination DN from the user. In the illustrated example, the database 20 determines the requested delay values at 306 (e.g., by searching the entries 22 and/or by launching explicit silent probes, or combinations thereof, etc.) and responds at 307 with suitable messaging to provide the delay values to the CCE1 10*a*. Based on these delay values, the CCE1 10*a* may then adjust carrier list at 308, for instance, to place the fastest (e.g., shortest delay time) carrier 352 first, the next fastest second, etc. It is noted at this point that other embodiments are possible, for instance, wherein the SCP network element 350 queries the database 20 in advance (e.g., prior to returning the list of carriers to CCE1 10*a* in the response 304), wherein the SCP would use the obtained delay information from the database 20 to order the list of carriers at least in part based on the delay values for these carriers. In either case, the CCE1 10*a* sends an IAM at 309 (e.g., for ISUP implementations, or SIP INVITE, etc.) and proceeds to route the call via specified first carrier 352, and if unsuccessful "overflows" to the 2nd carrier, etc.

While the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A system for routing a call through a network between a first call control element and a second call control element, the system comprising:
    a plurality of call control elements operatively associated with the network and accessible by user equipment to process and switch calls and to provide call features to calling or called parties; and
    a delay database operatively coupled with the network to allow queries by network elements including the call control elements, the delay database comprising one or more entries with individual entries including:
        a near network element identifier identifying one of the call control elements associated with a calling party;
        a far network element identifier identifying another one of the call control elements associated with a called party;
        a delay value indicating a measured delay associated with establishing a call through the network from the calling party associated with the call control element identified by the near network element identifier to the called party associated with the call control element identified by the far network element identifier; and
        a carrier identifier identifying a carrier used to route a call through the network associated with the delay value;
    wherein a first call control element queries the delay database to obtain at least one delay value associated with a particular call from a calling party user equipment associated with the first call control element to a called party user equipment associated with a second call control element, and wherein the first call control element uses the obtained delay value to process the call.

2. The system of claim 1, wherein the call control elements measure delays associated with calls routed through the network and report the measured delays to the delay database to populate and update the database entries.

3. The system of claim 2, wherein the delay database sends a message to the first call control element requesting that the first call control element report delay values associated with calls routed from the first call control element to the second call control element, wherein the first call control element measures delays associated with actual calls placed from calling party user equipment associated with the first call control element to called party user equipment associated with the second call control element, and wherein the first call control element reports the measured delays to the delay database.

4. The system of claim 3, wherein the first call control element reports the measured delays associated with the actual calls to the delay database periodically.

5. The method of claim 3, wherein the second call control element sends an address complete message to the first call control element in processing actual calls from calling party user equipment associated with the first call control element to called party user equipment associated with the second call control element, the address complete message including a jurisdiction information parameter identifying the called party user equipment associated with the second call control element.

6. The system of claim 2, wherein the delay database requests the first call control element to provide a delay value associated with calls routed from the first call control element to the second call control element, wherein the first call control element initiates a pseudo call to the second call control element, wherein the first call control element measures a delay associated with the pseudo call, and wherein the first call control element reports the measured delay associated with the pseudo call to the delay database.

7. The system of claim 6, wherein the first call control element sends a pseudo call setup message to the second call control element to initiate the pseudo call to the second call control element, the pseudo call setup message including a pseudo call indicia recognizable by the second call control element to indicate to the second call control element that the call is not to be connected to called party user equipment associated with the second call control element.

8. The system of claim 6, wherein the first call control element sends a pseudo call setup message to the second call control element to initiate the pseudo call to the second call control element, the pseudo call setup message including a location routing number associated with the second call control element.

9. The system of claim 1, wherein the individual database entries further comprise a latency identifier indicating the age of the delay value.

10. A method of operating a communications network for routing calls between calling and called parties associated with call control elements operatively associated with the network, the method comprising:
 providing a delay database accessible by elements of the network, the delay database comprising one or more entries with individual entries including:
  a near network element identifier identifying one of the call control elements associated with a calling party,
  a far network element identifier identifying another one of the call control elements associated with a called party,
  a delay value indicating a measured delay associated with establishing a call through the network from the calling party associated with the call control element identified by the near network element identifier to the called party associated with the call control element identified by the far network element identifier, and
  a carrier identifier identifying a carrier used to route a call through the network associated with the delay value;
 measuring delays associated with calls routed through the network between given pairs of call control elements, wherein measuring the delays comprises:
  the delay database initiating a subscription with a first call control element to provide delay values associated with calls routed from the first call control element to a second call control element,
  the first call control element measuring delays associated with actual calls placed from calling party user equipment associated with the first call control element to called party user equipment associated with the second call control element, and
  the first call control element reporting the measured delays associated with the actual calls to the delay database; and
 populating and updating the delay database with the measured delay values.

11. The method of claim 10, further comprising:
 querying the delay database to obtain at least one delay value associated with a particular call from a calling party user equipment associated with a first call control element to a called party user equipment associated with a second call control element; and using the obtained delay value to process the call.

12. The method of claim 10, wherein the first call control element reports the measured delays associated with the actual calls to the delay database periodically.

13. The method of claim 10, wherein measuring delays associated with the actual calls comprises the second call control element including a jurisdiction information parameter in an address complete message and sending the address complete message to the first call control element in processing an actual call from calling party user equipment associated with the first call control element to called party user equipment associated with the second call control element, the jurisdiction information parameter identifying the called party user equipment associated with the second call control element.

14. The method of claim 10, wherein measuring the delays comprises:
 the delay database requesting a first call control element to provide a delay value associated with calls routed from the first call control element to a second call control element;
 the first call control element initiating a pseudo call to the second call control element;
 the first call control element measuring a delay associated with the pseudo call; and
 the first call control element reporting the measured delay associated with the pseudo call to the delay database.

15. The method of claim 14, wherein initiating the pseudo call comprises the first call control element sending a pseudo call setup message to the second call control element, the pseudo call setup message including a pseudo call indicia recognizable by the second call control element to indicate to the second call control element that the call is not to be connected to called party user equipment associated with the second call control element.

16. The method of claim 14, wherein initiating the pseudo call comprises the first call control element sending a pseudo call setup message to the second call control element, the pseudo call setup message including a location routing number associated with the second call control element.

17. The method of claim 10, wherein after initiating the subscription by the delay database, the first call control element reports the delay values periodically to the delay database until the subscription between the first call control element and the second call control element is canceled by the delay database.

18. A method for routing a call through a network from a calling party user equipment associated with a first call control element to a called party user equipment associated with a second call control element, the method comprising:
 a network element querying a delay database associated with the network to obtain at least one delay value associated with routing calls from the first call control element through the network to the second call control element and a carrier identifier identifying a carrier used to route a call through the network associated with the at least one delay value; and the first call control element routing the call from the calling party to the called party based at least in part on the at least one delay value and the carrier identifier obtained from the delay database;

wherein the delay database comprises one or more entries with individual entries including:
- a near network element identifier identifying one of the call control elements associated with a calling party,
- a far network element identifier identifying another one of the call control elements associated with a called party,
- a delay value indicating a measured delay associated with establishing a call through the network from the calling party associated with the call control element identified by the near network element identifier to the called party associated with the call control element identified by the far network element identifier, and
- a carrier identifier identifying a carrier used to route a call through the network associated with the delay value.

19. The method of claim 18, wherein the network element querying a delay database is the first call control element.

20. A communications network, comprising:
a plurality of network elements operatively coupled with one another to form a communications network; and
a delay database operatively coupled to allow queries by network elements and comprising:
- a near network element identifier identifying a call control network element associated with a calling party,
- a far network element identifier identifying another call control network element associated with a called party,
- a delay value indicating a measured delay associated with establishing a call through the network from the calling party associated with the call control element identified by the near network element identifier to the called party associated with the call control element identified by the far network element identifier, and
- a carrier identifier identifying a carrier used to route a call through the network associated with the delay value;

wherein a first call control element is operative to query the delay database to obtain at least one delay value associated with a particular call from a calling party user equipment associated with the first call control element to a called party user equipment associated with a second call control element, and wherein the first call control element is operative to use the obtained delay value to process the call.

21. The network of claim 20, wherein the plurality of network elements includes a plurality of call control elements accessible by user equipment to process and switch calls and to provide call features to calling or called parties, and wherein the call control elements measure delays associated with calls routed through the network and report the measured delays to the delay database to populate and update the database entries.

22. The network of claim 21, wherein the delay database initiates a subscription with a first call control element to provide delay values associated with calls routed from the first call control element to a second call control element, wherein the first call control element measures delays associated with actual calls placed from calling party user equipment associated with the first call control element to called party user equipment associated with the second call control element, and wherein the first call control element reports the measured delays associated with the actual calls to the delay database.

23. The network of claim 21, wherein the delay database requests a first call control element to provide a delay value associated with calls routed from the first call control element to a second call control element, wherein the first call control element initiates a pseudo call to the second call control element, wherein the first call control element measures a delay associated with the pseudo call, and wherein the first call control element reports the measured delay associated with the pseudo call to the delay database.

* * * * *